Nov. 6, 1928.  1,690,240

T. NORCROSS

METHOD OF MANUFACTURING TIRES

Original Filed Aug. 26, 1925

Inventor
THOMAS NORCROSS.
By his Attorney
D Anthony Kuna

Patented Nov. 6, 1928.

1,690,240

UNITED STATES PATENT OFFICE.

THOMAS NORCROSS, OF ERDINGTON, ENGLAND, ASSIGNOR TO DUNLOP TIRE AND RUBBER CORPORATION OF AMERICA, OF BUFFALO, NEW YORK, A CORPORATION OF NEW YORK.

METHOD OF MANUFACTURING TIRES.

Original application filed August 26, 1925, Serial No. 52,499, and in Great Britain August 27, 1924. Divided and this application filed April 28, 1926. Serial No. 105,045.

In an application Serial No. 52,499, filed August 26, 1925, I have described an improved form of cushion tire and the method of making the same. This application is a division of said prior application and is directed to the improved method.

The invention will be understood from the following specification when read in connection with the accompanying drawings in which—

According to the invention I provide a rubber tire 1 having a central cavity 3 therein with a continuous or transversely split spacer ring or segments thereof made of soft iron or other ductile metal or other suitable material.

Grooves, which are preferably undercut, are formed in the inner sides of the metal base bands, and the spacer ring or the segments thereof are provided with either continuous projections or a series of projections or are otherwise so shaped that they are adapted to fit into the said grooves.

When the said spacer ring is, or the segments thereof are, fitted in position with the edges in the grooves formed in the edges of the base bands, pressure is applied to force the said bands towards each other when the metal of which the projections or otherwise shaped edges are formed is caused to flow and fill the grooves, thereby firmly holding the base bands at a predetermined distance from each other.

Figure 1:
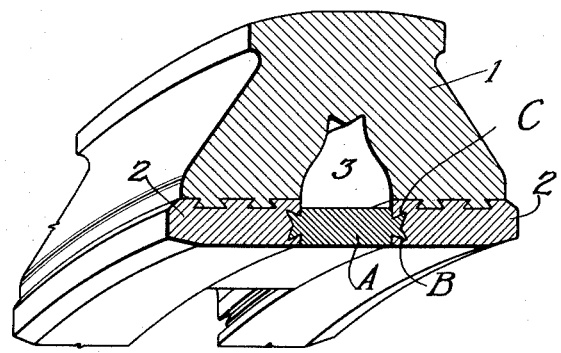
Fig. 1 is a cross-section of a tire made in accordance with my method.

The spacer ring A as shown in section in Fig. 1 is in the form of a transversely split ring which is provided with suitable projections B on each side which are adapted to enter into undercut grooves C formed in the adjacent inner sides of the base bands 2. The spacer ring A is made of soft iron or other ductile metal or other suitable material so that after it has been placed in position between the two bands 2, the metal forming the projections B is caused to flow and fill the undercut grooves C by the application of suitable pressure applied either manually or by a mechanical or hydraulic power press or the like to force the bands towards each other.

Figure 2:
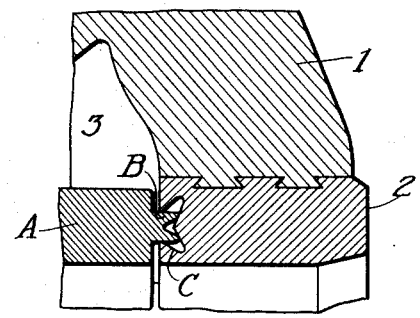
Figs. 2 and 3 are part sections showing steps in making a tire according to my method.
Figure 3:
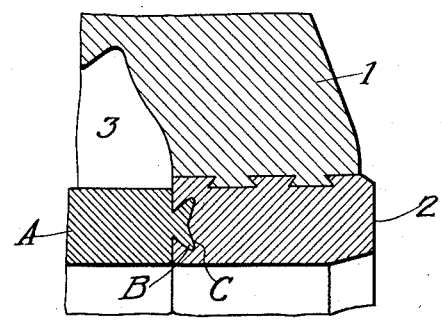
Figure 4:
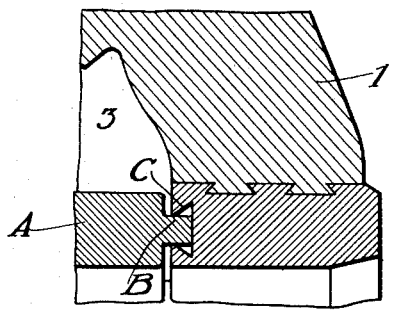
Figs. 4 and 5 are similar sections illustrating the use of a modified form of spacer ring.
Figure 5:
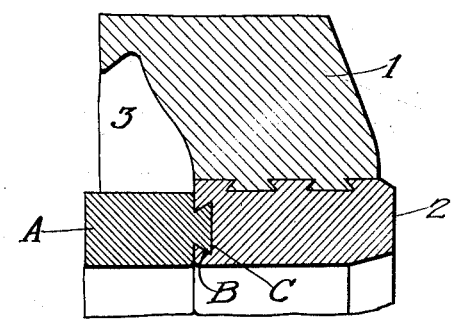

Fig. 2 shows a spacer ring A as machined and Fig. 3 shows the same ring after being subjected to pressure between the two bands 2 whereby the projections B have been distorted and forced into the grooves C in the base bands 2.

The grooves C may be of any suitable shape but preferably they are provided with an undercut edge or edges so that the bands 2 are securely locked together on the application of lateral pressure, (i. e., pressure exerted in the direction of the axis of rotation of the tire) and the projections B although preferably continuous throughout each edge of the ring A may be cut away at intervals to reduce the pressure necessary to force them into the grooves.

The projection B on the spacer ring may be of any suitable shape to enter the groove in the bands 2 and upon the application of lateral pressure thereto to permit of such distortion of the projections that they will lock with the undercut C in the bands 2.

Instead of the continuous spacer ring A I may use a series of segments spaced preferably at regular intervals throughout the circumference of the bands 2, such segments being of the same material and of the same section as that of the ring A.

While I have described in detail the specific embodiments of the invention illustrated, it is not to be construed that I am limited thereto as various modifications or substitution of equivalents may be made without departing from the scope of the invention as defined in the appended claims.

What I claim is:—

1. In the manufacture of cushion tires, the method which consists of providing a rubber body with a central cavity therein with grooved base bands secured adjacent the cavity, inserting a ductile spacer ring between said base bands, and applying a pressure against the peripheral edge of at least one of said base bands to force them toward each other and thereby upset the edges of the spacer ring within said grooves.

2. In the manufacture of cushion tires, the method which consists in providing a rubber body with grooved base bands secured thereto having undercut grooves formed in their opposed edges, inserting a spacer ring between said bands which is formed with ductile portions adapted to enter said grooves, and applying a lateral pressure to upset the ductile portions of the spacer ring within said undercut grooves.

3. In the manufacture of cushion tires, the method which consists in providing a rubber body with base bands secured thereto, inserting a spacer ring between said base bands, and interlocking the base bands with the spacer ring by the application of pressure against the peripheral edge of at least one of said base bands.

In witness whereof, I have hereunto signed my name.

THOMAS NORCROSS.